(12) United States Patent
Kliman et al.

(10) Patent No.: US 7,340,820 B2
(45) Date of Patent: Mar. 11, 2008

(54) MACHINE STATOR FABRICATION METHOD

(75) Inventors: Gerald Burt Kliman, Niskayuna, NY (US); Guanzhong Gao, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 414 days.

(21) Appl. No.: 10/810,427

(22) Filed: Mar. 29, 2004

(65) Prior Publication Data

US 2004/0178695 A1 Sep. 16, 2004

Related U.S. Application Data

(62) Division of application No. 09/683,900, filed on Feb. 28, 2002, now abandoned.

(51) Int. Cl.
*H02K 15/02* (2006.01)
*H02K 15/10* (2006.01)
*H02K 1/12* (2006.01)
*H02K 1/18* (2006.01)

(52) U.S. Cl. .................................. 29/596; 310/218

(58) Field of Classification Search .......... 29/596, 29/598; 264/104, 259, 328.18; 310/43, 310/44, 214, 215, 216, 218, 254, 259, 260
See application file for complete search history.

(56) References Cited

U.S. PATENT DOCUMENTS

| | | | | |
|---|---|---|---|---|
| 2,506,173 A | * | 5/1950 | Polard | 29/736 |
| 2,607,816 A | | 8/1952 | Ryder et al. | 310/42 |
| 2,695,969 A | | 11/1954 | Yates | 310/259 |
| 3,641,408 A | | 2/1972 | Fiocca | 318/758 |
| 3,827,141 A | | 8/1974 | Hallerback | 29/596 |
| 3,862,492 A | * | 1/1975 | Crabb | 29/596 |
| 3,914,859 A | | 10/1975 | Pierson | 29/596 |
| 4,065,673 A | | 12/1977 | Fiocca | 378/93 |
| 4,255,684 A | * | 3/1981 | Mischler et al. | 310/216 |
| 4,392,072 A | | 7/1983 | Rosenberry | 310/216 |
| 4,466,182 A | | 8/1984 | Lamatsch et al. | 29/596 |
| 4,613,842 A | | 9/1986 | Ichiyama et al. | 336/218 |
| 4,672,252 A | | 6/1987 | Spirk | 310/216 |

(Continued)

FOREIGN PATENT DOCUMENTS

EP 0920051 A1 11/1998

(Continued)

OTHER PUBLICATIONS

Compression Molding, 1989, About, http://composite.about.com/library/glossary/c/bldef-c1203.htm.*

(Continued)

*Primary Examiner*—A. Dexter Tugbang
*Assistant Examiner*—Livius R. Cazan
(74) *Attorney, Agent, or Firm*—Ann M. Agosti; Patrick K. Patnode

(57) ABSTRACT

A machine stator is fabricated by positioning pre-wound stator windings with respect to a laminated stator yoke and directly molding composite tooth tips into contact with respective teeth of the laminated stator yoke, or by positioning pre-wound stator windings around respective stator teeth and then coupling the stator teeth and a stator yoke, wherein the stator yoke radially surrounds the stator teeth.

14 Claims, 6 Drawing Sheets

U.S. PATENT DOCUMENTS

| | | | |
|---|---|---|---|
| 4,698,539 A | 10/1987 | Workman | 310/216 |
| 4,760,588 A | 7/1988 | Shaw | 378/93 |
| 4,819,259 A | 4/1989 | Tanaka | 378/125 |
| 4,987,065 A | 1/1991 | Stavrianopoulos et al. | 435/5 |
| 4,994,700 A | 2/1991 | Bansal et al. | 310/215 |
| 5,015,904 A | 5/1991 | Kleemann | 310/189 |
| 5,390,409 A | 2/1995 | Courtney | 29/596 |
| 5,570,503 A | 11/1996 | Stokes | 29/596 |
| 5,680,692 A | 10/1997 | Kliman et al. | 29/596 |
| 5,722,152 A | 3/1998 | Sumi et al. | 29/596 |
| 5,798,138 A | 8/1998 | Legierse et al. | 427/97.4 |
| 5,866,965 A | 2/1999 | Baronosky et al. | 310/208 |
| 5,883,487 A | 3/1999 | Rosenzweig et al. | 310/781 |
| 5,890,277 A * | 4/1999 | Kliman | 29/596 |
| 5,912,522 A | 6/1999 | Rivera | 310/184 |
| 5,946,796 A * | 9/1999 | Burch | 29/736 |
| 5,990,588 A | 11/1999 | Kliman et al. | 310/86 |
| 6,057,621 A | 5/2000 | Suzuki et al. | 310/156.12 |
| 6,166,474 A | 12/2000 | Kohara et al. | 310/258 |
| 6,274,962 B1 | 8/2001 | Kliman | 310/261 |
| 6,462,456 B1 | 10/2002 | DeCristofaro et al. | 310/216 |
| 6,472,792 B1 | 10/2002 | Jack et al. | 310/254 |
| 6,487,769 B2 | 12/2002 | Ketterer et al. | 29/596 |
| 6,495,936 B2 | 12/2002 | Kikuchi et al. | 310/58 |
| 6,583,530 B2 | 6/2003 | Hsu | 310/254 |
| 2002/0149282 A1* | 10/2002 | Heidrich | 310/218 |

FOREIGN PATENT DOCUMENTS

| | | | |
|---|---|---|---|
| EP | 910152 A1 | | 4/1999 |
| JP | 01055025 | | 3/1989 |
| JP | 6284663 A | | 10/1994 |
| JP | 6343248 A | | 12/1994 |
| JP | 07336992 A | * | 12/1995 |
| JP | 946940 A | | 2/1997 |
| JP | 10014145 | | 1/1998 |
| JP | 10126981 A | | 5/1998 |
| JP | 10201187 | | 7/1998 |
| JP | 10304609 A | | 11/1998 |
| JP | 11187633 A | | 7/1999 |
| JP | 200069724 A | | 3/2000 |
| JP | 2000316240 A | | 11/2000 |
| JP | 2001128393 A | | 5/2001 |
| WO | WO9950949 | | 10/1999 |
| WO | WO0069047 | | 11/2000 |
| WO | WO0112365 | | 2/2001 |
| WO | WO0186779 | | 11/2001 |

OTHER PUBLICATIONS

Williamson, et al., Optimization of the Geometry of Closed Rotor Slots for Cage Induction Motors, IEEE Trans. on Industry Applications, vol. 32, Issue 3, May-Jun. 1996, pp. 560-568.

Miraoui, A, et al., Performance Analysis of Permanent Magnet Brushless DC Motor, 6th International Conference on Electrical Machines and Drives, 1993, pp. 371-375.

Alhamadi, et al., "Modeling and Experimental Verification of the Performance of a Skew Mounted Permanent Magnet Brushless DC Motor Drive with Parameters Computerized from 3D-FE Magnet Field Solutions", IEEE Trans on Energy Conversion, vol. 9, No. 1, Mar. 26, 1994.

Li, et al., "Two-Axis Model Development of Cage-Rotor Brushless Doubly Fed Machines", IEEE Trans on Energy Conversion, vol. 6, No. 3, Sep. 1991, pp. 453-459.

* cited by examiner

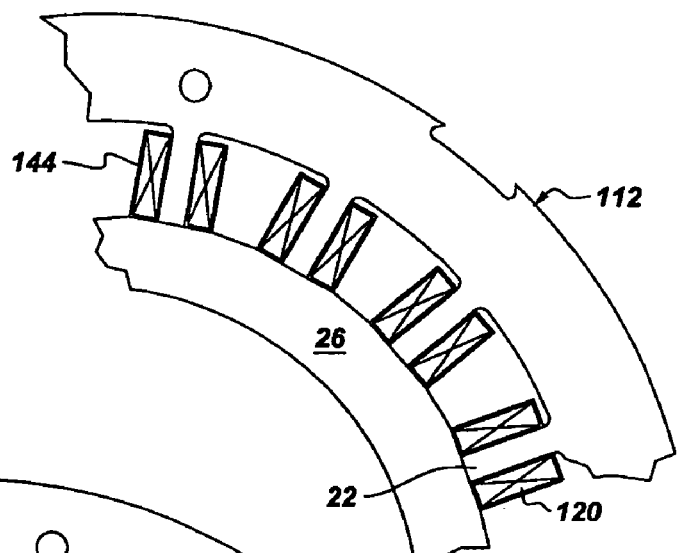
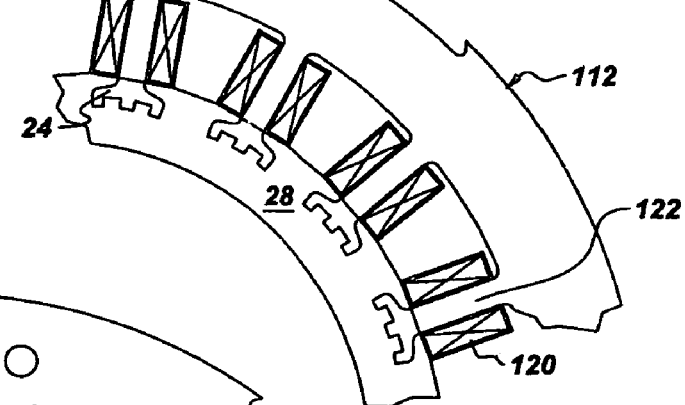
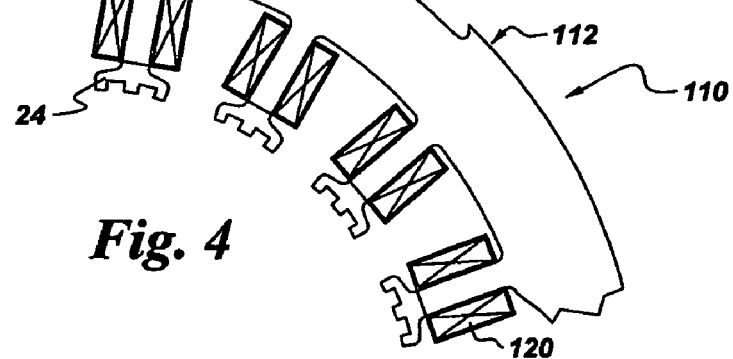

MACHINE STATOR FABRICATION METHOD

This application is a division of application Ser. No. 09/683,900 which was filed on 28 Feb. 2002, and is now abandoned.

BACKGROUND OF INVENTION

The invention relates generally to electrical machines and more particularly to machine stators.

In the motor industry, it is commercially advantageous to have a motor be as small and cost-efficient as feasible. Conventional motor stators are fabricated by punching laminations with each having an outside diameter and semi-closed slots or insertion of stator windings. The laminations are stacked, annealed, and positioned in an automatic winding machine. Because of the small openings of the slots, the windings cannot be wound in a compact manner and typically occupy no more than about thirty-five percent of the slot area. Thus size reductions of conventional laminated motor stators are limited.

Commonly assigned Kliman et al., U.S. Pat. Nos. 5,680,692 and 5,793,138, describe winding insulated coils and then molding a magnetic-flux-carrying stator or rotor around the pre-wound coils. In molded embodiments, the core cannot be annealed to the same extent as a laminated yoke can be annealed due to limitations of the material and of the winding insulation. Thus, depending upon the size of the stator, the molding process has the potential to leave high stresses in the core. Additionally, magnetic powder is significantly more expensive than magnetic laminations.

Commonly assigned Kliman et al., U.S. Pat. No. 5,990,588, describes a plurality of circumferentially spaced ferromagnetic strips of various alternative shapes integrally formed in plastic material of a pump assembly enclosure for sealing the stator from fluid in the gap between the stator and rotor. The ferromagnetic strips are described as being in direct contact with respective pole teeth of the stator in a manner which did not noticeably degrade motor performance as compared with fully laminated stator embodiments. Windings are not shown or described.

Commonly assigned Erdman et al., European Patent No. 613,234 B1, describes winding coils (preferably of rectangular cross section) on a conventional high speed bobbin coil winding machine and inserting the wound coils on teeth without tips. In one embodiment of Erdman et al., laminated pole tips can be individually attached to each pole. Erdman et al. describes the individual attachment process as being time-consuming and expensive and provides an alternative embodiment wherein On annulus of alternating interlocking sections of molded extruded powdered iron/plastic composite and non-magnetic plastic sections is slipped into place and located with suitable keys using conventional positioning techniques. In several more specific embodiments of Erdman et al., the coils are wound to conform to the shape of the annulus and the coils are wound into trapezoidal shapes to maximize the use of the space between the stator teeth.

It would be desirable to have an motor fabrication process which more effectively balances the competing goals of low-cost and high-performance.

SUMMARY OF INVENTION

Briefly, in accordance with one embodiment of the present invention, a method for fabricating a machine stator comprises: positioning pre-wound stator windings around respective teeth of a laminated stator yoke; and directly molding composite tooth tips into contact with respective teeth.

In accordance with another embodiment of the present invention, a method for fabricating a machine stator comprises: positioning pre-wound stator windings around respective stator teeth; and then coupling the stator teeth and a stator yoke, wherein the stator yoke radially surrounds the stator teeth.

In accordance with another embodiment of the present invention, a method for fabricating a machine stator comprises: filling end portions of stator windings with non-conducting, non-magnetic particles; and then compacting the end portions.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein:

FIGS. 2-4 are sectional views illustrating fabrication stages for a stator in accordance with one embodiment of the present invention.

DETAILED DESCRIPTION

Figure 1:
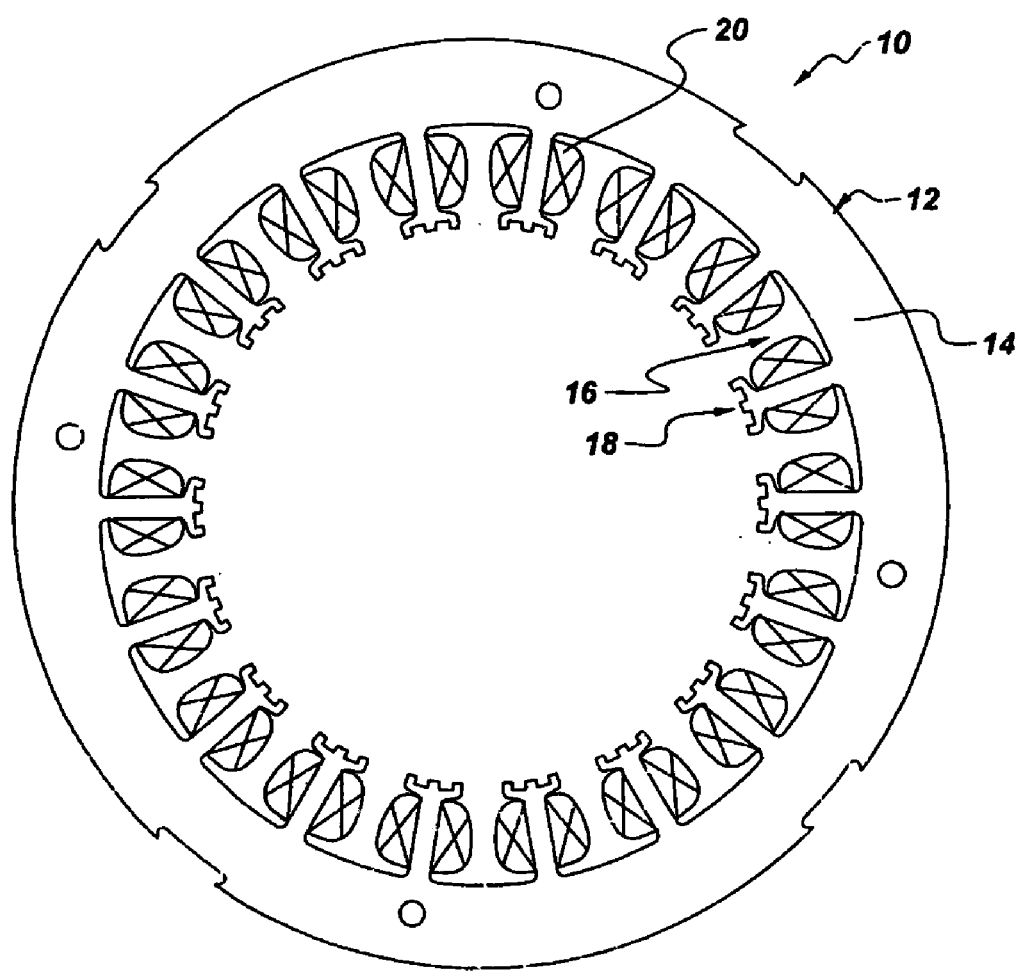
FIG. 1 is a sectional view illustrating a conventional stator.

FIG. 1 is a sectional view illustrating a conventional stator comprising a stator yoke 12 which in turn comprises stator laminations 14 defining slots 16 and teeth 18. The stator yoke is wound with stator windings 20.

FIGS. 2-11 are sectional views illustrating fabrication stages for a machine stator in accordance with several embodiments of the present invention comprising: (a) positioning pre-wound stator windings 120, 220, 320 around respective teeth 22, 122, 222 of a laminated stator yoke 112, 212; and (b) directly molding composite tooth tips 24 into contact with respective teeth. As used herein "directly molding" means that the act of molding of the tooth tips results in contact with the respective teeth when molding is complete. Directly molding is in contrast to molding the tooth tips in advance and then inserting the tooth tips into contact with the respect teeth.

The embodiments of FIGS. 2-11 are useful because the stator windings are wound prior to placement around the respective teeth, because a minimal amount of composite material is required, and because the laminated stator yoke (without windings and tooth tips) can be annealed to improve the stator performance.

Referring more specifically to FIG. 2, a plurality of compact pre-wound stator windings 120 are positioned around teeth 22. As shown in FIGS. 5-8, key notches can be present in the respective teeth. Windings 120 are typically wound around rectangular bobbins, for example, and radially slid over respective teeth 22. An alternative embodiment includes an automated apparatus 26 (such as an expanding mandrel) on which the wound bobbins are loaded and nested together so that the outer diameter of the bobbin/winding combination is less than the inner diameter of the stator teeth. The apparatus is then expanded thus sliding all of the bobbins over all of the stator teeth simultaneously.

Laminated stator yoke 112 typically comprises a stack of stator laminations without conventional tooth tips. Laminations of the laminated stator yoke comprise magnetic lamination material such as iron or steel, for example. Windings 120 typically comprise conventional winding material such as copper coated by an insulator such as an enamel, for example. Typically, conventional enamels are suitable for use in any of the embodiments of the present invention because, particularly if the windings are neatly wound in a regular manner without crossovers, conventional enamels are expected to be strong enough to withstand the compression discussed with respect to FIGS. 9-12.

Insulation 144 is typically situated around at least portions of the windings. In one embodiment, the insulation comprises a conventional slot liner type material such as a MYLAR™ polyester film or a NOMEX™ synthetic aromatic polyamide polymer film (MYLAR and NOMEX are trademarks of DuPont Co.), for example.

FIG. 3 is a view similar to that of FIG. 2 with the addition of a mold form 28 and composite tooth tip 24 material. The composite tooth tip material typically comprises magnetically conductive particles and a suitable binder. In one embodiment, the composite tooth tip material comprises particles of magnetic material such as iron coated with a polymer, for example. Composite tooth tip material is introduced into mold form 28 by any suitable technique with one example being injection. For some binding materials, curing is useful.

FIG. 4 illustrates the stator 110 after the removal of mold form 28 (FIG. 3). In one embodiment, once the mold form is in place, the composite tooth tip material is filled in from one end, compacting pressure is applied from the filling end, and the mold form is then removed axially. To facilitate removal of the mold form, a conventional mold release compound can be coated on the mold form prior to positioning the mold form. An alternative or additional technique to facilitate removal of the mold form is to incorporate "draft" into the mold. In the draft technique, a small taper is formed from one end of the mold form to the other so that, when the mold is moved, space opens up between the mold form and the molded part.

FIGS. 5-8 are sectional views illustrating fabrication stages for a stator 210 in accordance with another embodiment of the present invention. The embodiment of FIGS. 5-8 is similar to that of the embodiment of FIGS. 2-4 with one difference being that the same volume of pre-wound stator windings can be fit into smaller slots between teeth 222.

Figure 5:
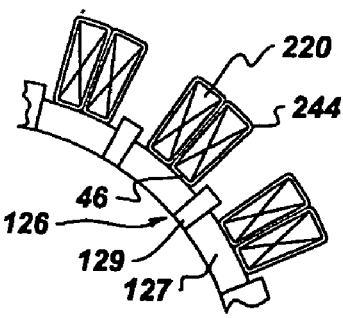
FIGS. 5-8 are sectional views illustrating fabrication stages for a stator in accordance with another embodiment of the present invention.
Figure 6:
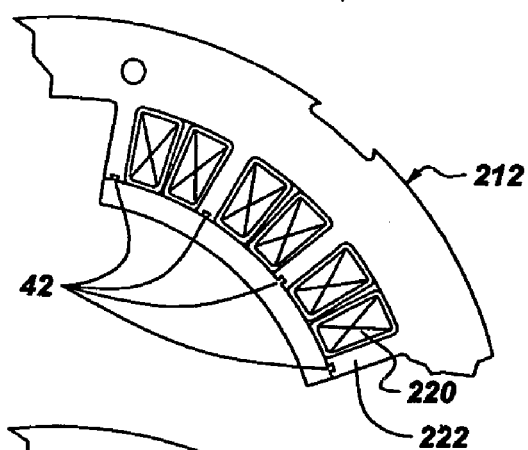

FIG. 5 is a sectional view illustrating a mandrel 126 supporting windings 220. In this embodiment, the pre-wound windings 220, wrapped in insulation 244, are longer than teeth 222 (FIG. 6). Mandrel 126 typically comprises fixed parts 129 that bear against the stator teeth forming slots for the long, pre-wound coils. Movable parts 127 push the coils into the slots and compact them radially such that they are contained completely within the slot. The driver for the movable parts is typically mechanical, hydraulic or electromagnetic, for example.

For embodiments wherein compression of wound wires will occur, insulation 244 may beneficially comprise a corrugated material that can be compressed along with the windings.

FIG. 6 is a view similar to that of FIG. 5 illustrating windings 220 after the windings have been positioned and compressed around respective teeth 222 of laminated stator yoke 212. Teeth 222 of stator yoke 212 are shown as including respective key notches 42 for purposes of illustration. Although it would be feasible to first compress the windings and then position them around the respective teeth, in practice it is expected to be more effective to simultaneously position and compress the windings in place.

Figure 7:
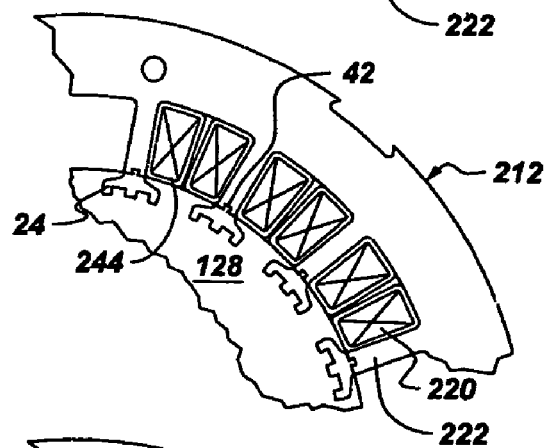
Figure 8:
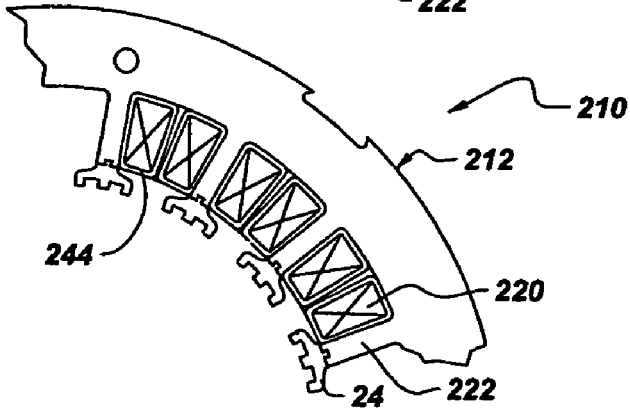

FIG. 7 is a view similar to that of FIG. 6 with the addition of a mold form 128 and composite tooth tip 24 material, and FIG. 8 illustrates the stator 210 after the removal of the mold form 28. Mold form 128 may comprise a different element from mandrel 126 or mold form 128 may additionally serve as the winding positioning mandrel without the need for a separate element 126.

Figure 9:
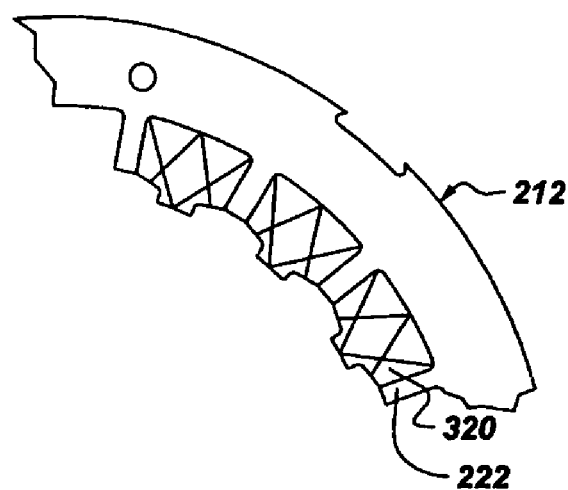
FIGS. 9-11 are sectional views illustrating fabrication stages for a stator in accordance with another embodiment of the present invention.
Figure 10:
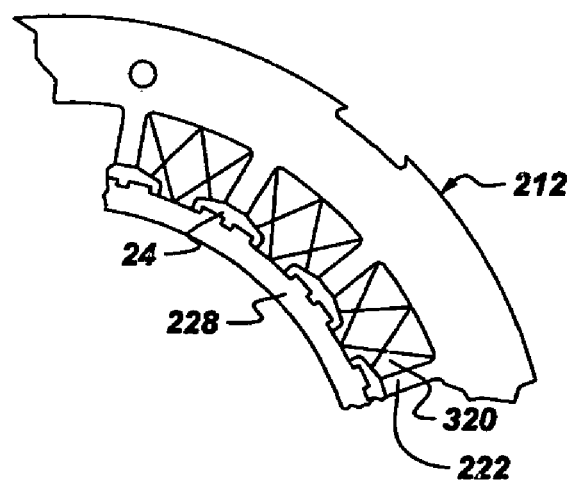
Figure 11:
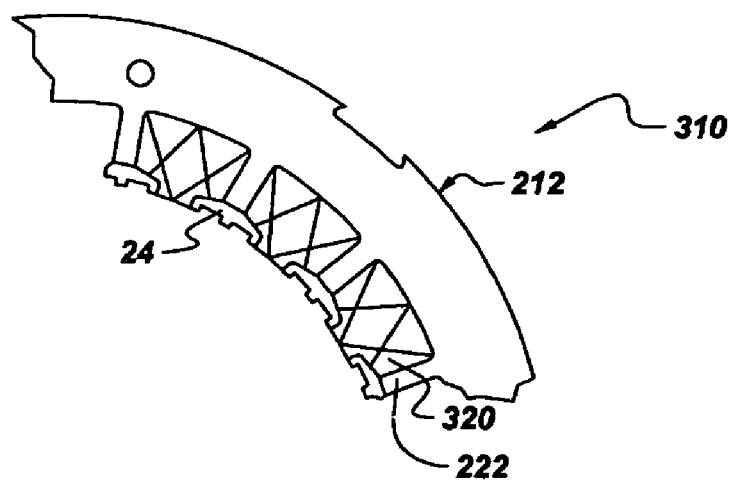

FIGS. 9-11 are sectional views illustrating fabrication stages (positioning of windings 320 (FIG. 9); molding tooth tips 24 (FIG. 10); and completed machine stator 310 (FIG. 11)) for a stator in accordance with another embodiment of the present invention. The embodiment of FIGS. 9-11 is similar to the embodiment of FIGS. 5-8 except that the shape of the stator windings is selected to facilitate fabrication a desired tooth tip 24 shape during molding.

In the embodiments of FIGS. 9-11, it is beneficial to compress the windings around respective teeth either prior to or substantially simultaneously with molding of tooth tips 24. "Substantially simultaneously" means that either all winding compression occurs with the compression of composite tooth tip material or some winding compression occurs in advance of the composite tooth tip material compression and some winding compression occurs along with composite tooth tip material compression. Although not shown in FIGS. 9-11, insulation of the type described with respect to FIGS. 2-8 can be used. Similarly, a hollow mandrel, mold form 228, or combination thereof can be used for positioning, compression, or a combination thereof. The embodiment of FIGS. 9-11 is particularly convenient because the mold form does not need to extend behind the tooth tips and coated magnetic particles can easily be positioned between the mandrel and respective teeth and windings and compressed in the space between the mandrel and the laminated stator yoke.

In one example of compression molding, a driver coil (not shown) is inserted into a mold form and pulsed so as to push the mandrel outward towards the laminated stator yoke. Alternatively, a conventional hydraulic press is used, for example. Regardless of the type of compression that is selected, it is useful to position end caps (not shown) at both ends of the mold to minimize escape of composite tooth tip material.

Figure 12:
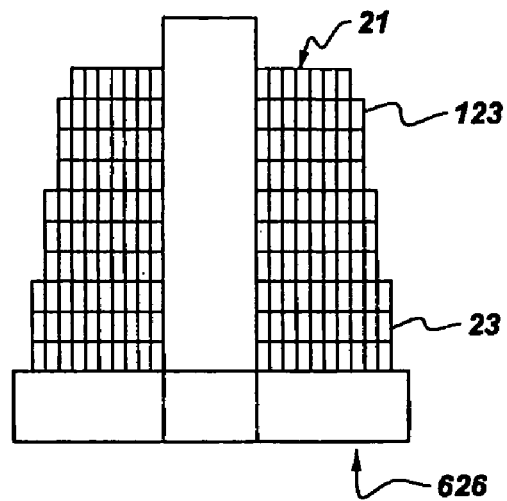
FIGS. 12-13 are sectional views illustrating fabrication stages for a stator in accordance with another embodiment of the present invention.
Figure 13:
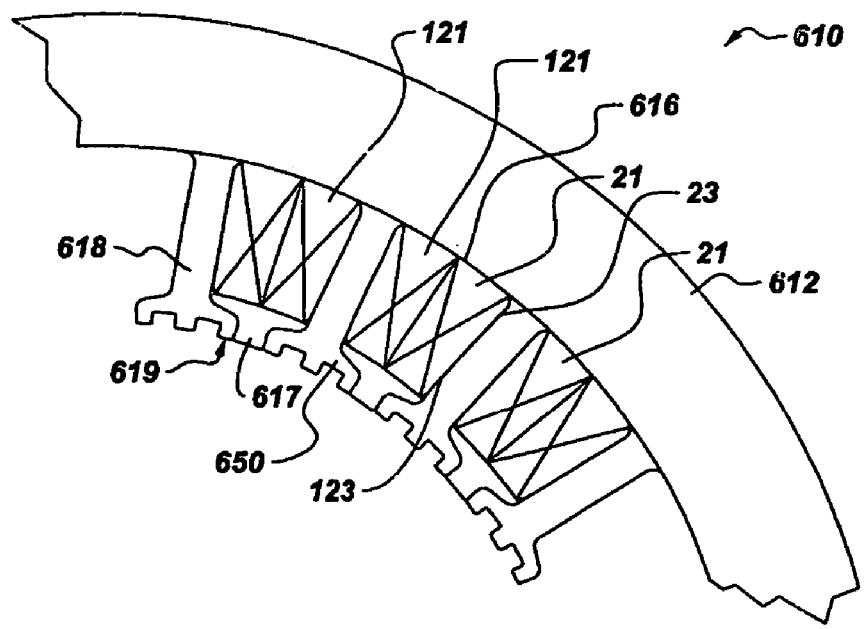

FIGS. 12-13 are sectional views illustrating fabrication stages for a stator in accordance with another embodiment of the present invention. A method embodiment for fabricating a machine stator 610 comprises: positioning pre-wound stator windings 21 around respective stator teeth 618; and then coupling the stator teeth and a stator yoke 612, wherein the stator yoke radially surrounds the stator teeth.

In a more specific embodiment, the pre-wound stator windings are provided by winding each stator winding to have a wider winding portion 23 and a narrower winding portion 123. The windings can then be positioned around the stator teeth in a manner such that the narrower winding portions are closer to tooth tips 650 than the wider winding portions (and the wider winding portions are closer to the stator yoke). Slots between stator teeth are generally narrower in the tooth tip region than in the stator yoke region, so this embodiment is useful for facilitating sliding of windings 21 and 121 onto stator teeth 618.

In an even more specific embodiment, as shown in FIG. 12, the pre-wound stator windings are provided by flat winding the pre-wound stator windings on a mandrel 626. By using flat (rectangular) coil material, a dense winding and thus a high slot filling ratio (ratio of space filled by stator windings vs. total space) is more readily achievable. In one embodiment, the stator winding material comprises copper, for example.

As further shown in FIGS. 12-13, a first winding 21 can be wound around a bobbin 626 and then slid over a respective tooth 618. A second winding 121 can likewise be wound around a bobbin and slid over a respective tooth such that portions of windings 21 and 121 are situated in a common slot 616.

The stator teeth comprise any structurally and electromagnetically appropriate material. In one embodiment, the stator teeth comprise laminated stator teeth and a material such as iron, for example. In another embodiment, the stator teeth comprise composite stator teeth and a material such as plastic coated iron particles, for example. In still another embodiment, the stator teeth comprise a combination of laminated and composite materials. In one aspect of the combination embodiment, the stator teeth comprise discrete teeth (typically laminated) and tooth connectors 617 (typically composite) are provided between the stator teeth. Alternatively, the stator teeth may collectively comprise an integral tooth body 619.

Stator yoke 612 comprises any structurally and electromagnetically appropriate material. In one embodiment, stator yoke 612 comprises a laminated stator yoke and a material such as iron, for example. In another embodiment, stator yoke 612 comprises a composite stator yoke and a material such as plastic coated iron particles, for example.

To reduce core losses, in several embodiments stator teeth 618 comprise material having a radially oriented grain, and stator yoke 612 comprises material having an azimuthally oriented grain. In an even more specific related embodiment, stator yoke 612 comprises a laminated stator yoke having an azimuthally oriented grain, and stator teeth 618 comprise composite stator teeth having a radially oriented grain.

In one embodiment, coupling stator teeth 618 and stator yoke 612 comprises shrink-fitting the stator yoke and the stator teeth. Shrink-fitting is typically accomplished by heating stator yoke 612, dropping stator yoke 612 around stator teeth 618 and windings 21, 121, and allowing stator yoke 612 to cool.

Previously described embodiments of the present invention have many advantages, including effective balance of the competing goals of low-cost and size (from the composite material) and high-performance (from the laminations).

Figure 14:
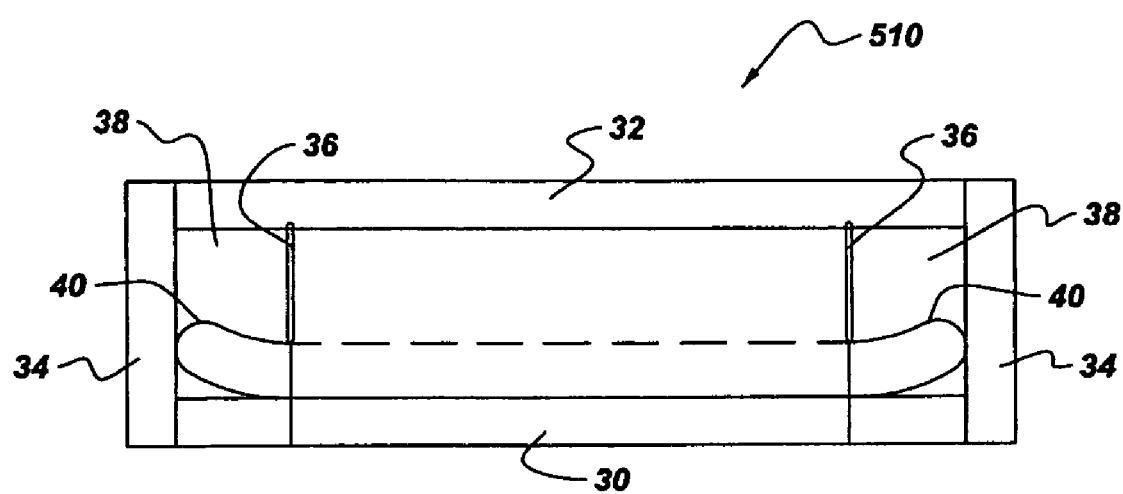
FIG. 14 is a sectional side view illustrating another stator embodiment of the present invention.

FIG. 14 is a sectional side view illustrating another stator embodiment of the present invention directed to end winding compression by filling end portions 40 of stator windings with non-conducting, non-magnetic particles 38, and compacting the end portions and the particles. The embodiment of FIG. 14 is useful both in electronically commutated machines and induction machines, for example, whether the stator is entirely laminated, entirely molded, or a combination of laminations and molding.

To minimize the extent of particles 38 within the stator yoke, dividers 36 can be used between the stator yoke and the end winding regions. In one embodiment, the dividers comprise thin plastic membranes, for example, which are later either removed or left in place.

For the compression, the end winding region is typically surrounded by mandrel 30, outer mold form 32, and end plates 34, for example, each of which comprises a material with sufficient structural integrity to withstand the compression process. On embodiment uses steel, for example. The compression itself is directed from any of the three directions (mandrel 30, mold form 32, or end plates 34) or a combination of the three directions.

After the end windings are compacted, non-magnetic particles 38 may optionally be removed. Alternatively, particularly if filling the end portions comprises filling the end portions with material comprising the non-conducting non-magnetic particles and a binder, the material may conveniently be left in place after compaction. Leaving the material in place can beneficially result in the stator being resistant to moisture, having improved heat transfer properties, and having increased mechanical stability.

Managing the end windings space has several advantages in that end windings may physically limit the amount of compression that can be used for regular windings and teeth, and added inductance from regularly designed end windings can be detrimental to electrical controls of the machine.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for fabricating a machine stator comprising:
   (a) positioning pre-wound stator windings around respective teeth of a laminated stator yoke, each tooth having a first end and a second end, wherein each tooth extends radially inward toward the center of the stator such that the first end is closer to the center of the stator than the second end; and
   (b) directly molding composite tooth tips into contact with the first end of respective teeth of the laminated stator yoke, such that each composite tooth tip does not extend in a radially outward direction toward the outer periphery of the stator yoke between the first end and the second end of its corresponding tooth, and further such that a substantially flat surface contact devoid of recesses between each composite tooth tip and its corresponding tooth solely provides fixation of the composite tooth tip.

2. The method of claim 1 further comprising, prior to positioning, annealing the laminated stator yoke.

3. The method of claim 1 wherein positioning comprises radially sliding the pre-wound stator windings over the respective teeth.

4. The method of claim 1 further comprising, prior to directly molding, providing insulation around at least portions of the windings.

5. The method of claim 4 wherein the insulation comprises slot liners.

6. The method of claim 1 wherein directly molding comprises injection molding the composite tooth tips.

7. The method of claim 1 wherein positioning comprises compressing the pro-wound stator windings around the respective teeth.

8. The method of claim 7 further comprising, prior to positioning, situating the pre-wound stator windings on a mandrel in a pattern aligned with gaps between the stator teeth.

9. The method of claim 7 wherein compressing is performed prior to directly molding.

10. The method of claim 1 wherein directly molding comprises compression molding the composite tooth tips.

11. The method of claim 10 further comprising, prior to positioning, winding the stator windings in a winding shape selected to facilitate fabrication of a desired tooth tip shape during molding.

12. The method of claim 11 wherein positioning comprises compressing the pre-wound stator windings around the respective teeth, and wherein compressing the pre-wound stator windings and compression molding occur substantially simultaneously.

13. The method of claim 12 further comprising, prior to positioning, situating the pro-wound stator windings on a hollow mandrel in a pattern aligned with gaps between the stator teeth.

14. The method of claim 13 wherein compression molding comprises providing coated magnetic particles between the mandrel and respective teeth and windings and compressing the space between the mandrel and the laminated stator yoke.

* * * * *